Figure 1:
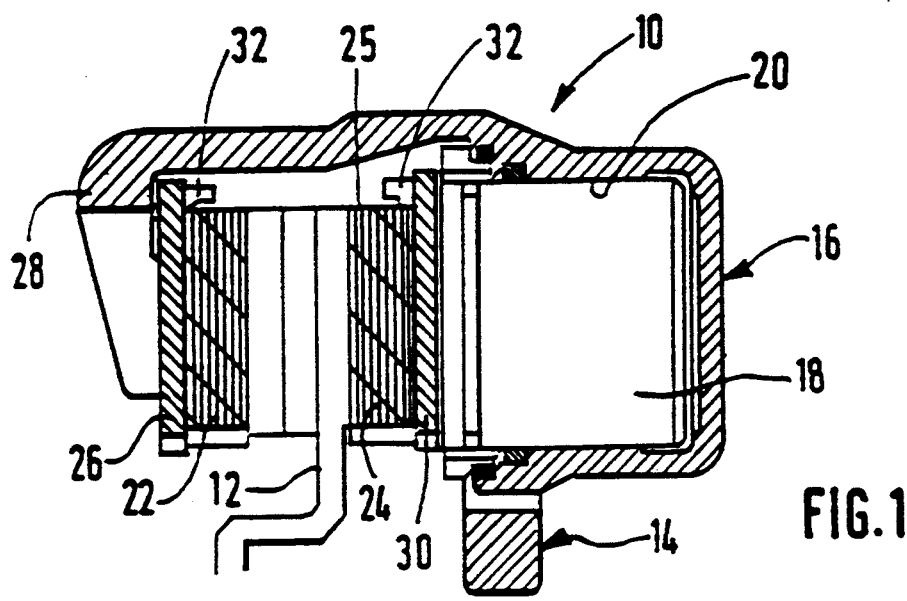

United States Patent [19]
Deit et al.

[11] Patent Number: 5,339,928
[45] Date of Patent: Aug. 23, 1994

[54] FRICTION MEMBER PROVIDED WITH A WEAR INDICATOR DEVICE AND DISK-BRAKE FITTED WITH SUCH MEMBER

[75] Inventors: Gérard L. Deit, Courtry; Jean L. Gerard, Bagnolet, both of France

[73] Assignee: Bendix Europe Services Techniques, Drancy, France

[21] Appl. No.: 947,875

[22] Filed: Sep. 21, 1992

[30] Foreign Application Priority Data

Sep. 30, 1991 [FR] France .................. 91 11983

[51] Int. Cl.⁵ .......................................... F16D 65/092
[52] U.S. Cl. ............................ 188/1.11; 192/30 W
[58] Field of Search ............... 188/1.11, 73.35, 73.1, 188/73.31; 116/208; 192/30 W

[56] References Cited

U.S. PATENT DOCUMENTS

| | | | |
|---|---|---|---|
| 3,190,397 | 6/1965 | Sudres | 188/1.11 |
| 4,037,689 | 7/1977 | Maeharan | 188/1.11 |
| 4,085,824 | 4/1978 | Nomura | 188/1.11 |
| 4,085,826 | 4/1978 | Ritsema et al. | 188/1.11 |
| 4,174,024 | 11/1979 | Hagiwara | 116/208 X |
| 4,460,067 | 7/1984 | Katagiri et al. | 188/1.11 |
| 4,498,559 | 2/1985 | Katagiri et al. | 188/1.11 |
| 4,745,992 | 5/1988 | Lusa | 188/1.11 |
| 5,033,590 | 7/1991 | Kobayashi et al. | 188/1.11 |

FOREIGN PATENT DOCUMENTS

| | | |
|---|---|---|
| 2832443 | 2/1979 | Fed. Rep. of Germany . |
| 2224330 | 10/1974 | France . |
| 2137560 | 2/1977 | France . |
| 0154535 | 9/1982 | Japan .................. 188/1.11 |
| 0211034 | 12/1983 | Japan .................. 188/1.11 |

*Primary Examiner*—Robert J. Oberleitner
*Assistant Examiner*—Peter M. Poon
*Attorney, Agent, or Firm*—Larry J. Palguta; Leo H. McCormick, Jr.

[57] ABSTRACT

The present invention relates to a friction member comprising a support plate (26, 30) and a friction element (22, 24) arranged on one side of the support plate 26, 30), the friction element (22, 24) being adapted to engage one face of a rotating member (12), and at least one wear indicator (32) associated with the support plate (26, 30) so as to generate an audible signal when the friction element (22, 24) possesses, on account of its wear, a predetermined thickness (L). According to the invention, the wear indicator (32) is formed by a spring comprising an intermediate part (34) for fixing of the wear indicator (32) onto the support plate (26, 30) on the side of the latter which bears the friction element (22, 24), a first end part (36) for emission of the audible signal and a second end part (40, 50, 36') for locking of the wear indicator (32) in rotation with respect to the support plate (26, 30).

5 Claims, 3 Drawing Sheets

FRICTION MEMBER PROVIDED WITH A WEAR INDICATOR DEVICE AND DISK-BRAKE FITTED WITH SUCH MEMBER

The present invention relates to a friction member comprising a support plate and a friction element arranged on one side of the support plate, the friction element being adapted to engage one face of a rotating member.

Such a friction member is used for the braking of motor vehicles by means of disk-brakes or drum-brakes. A wear indicator is usually associated with the friction member in order to indicate to the driver that the friction element has reached such a thickness that it is necessary to replace the friction member. Electrical indicators, habitually used in order to light an indicator light on the dashboard of the vehicle, may prove incompatible with antilocking or antiskid systems of the wheels, in increasingly general use. Audible wear indicators are then used.

Various types of indicators are known which generate an audible signal so as to warn the driver of the excessive wear of the friction element. In most cases, these wear indicators of the prior art necessitate certain modifications to the existing brakes when they have to be integrated into the brake assembly. These modifications may relate to the friction element in itself as in U.S. Pat. No. A-3,190,397, but also to the rotating member of the brake which is adapted to be engaged by the wear indicator so as to generate the audible warning signal as in U.S. Pat. No. A-4,085,824, and sometimes to other parts of the brake such as the caliper or the clevis in a disk-brake as in U.S. Pat. No. A-4,498,559. Moreover, in certain wear indicators of the prior art, the mounting of the indicator on the friction member prevents replacement of the friction element when the wear indicator is in place and vice versa. Finally, the known wear indicators often produce, when they come into operation, a signal which is audible only in the vicinity of the brake thus equipped, and which is nearly inaudible inside the passenger space of the vehicle.

The present invention provides a friction member associated with a wear indicator of audible type which can easily be fitted onto an existing brake without necessitating any modifications during the construction of this brake, the wear indicator being reliable in operation and emitting an audible signal of a sufficient intensity to be heard in all circumstances.

To this end, the invention provides a friction member comprising a support plate and a friction element arranged on one side of the support plate, the friction element being adapted to engage one face of a rotating member, and at least one wear indicator associated with the support plate so as to generate an audible signal when the friction element possesses, on account of its wear, a predetermined thickness.

According to the invention, the wear indicator is formed by a spring comprising an intermediate part for fixing of the wear indicator onto the support plate on the side of the latter which bears the friction element, a first end part for emission of the audible signal and a second end part for locking of the wear indicator in rotation with respect to the support plate.

Figure 2:
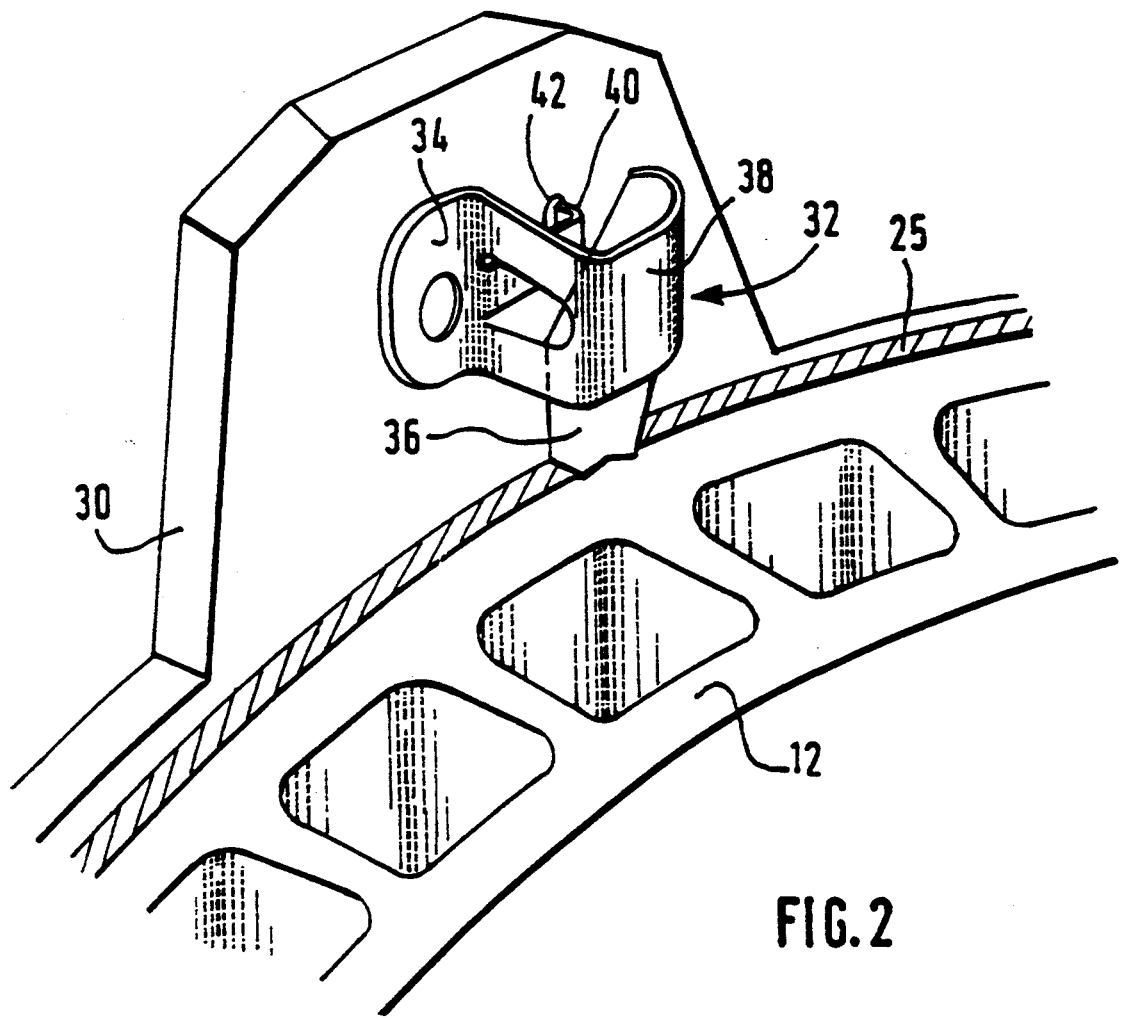
Figure 3:
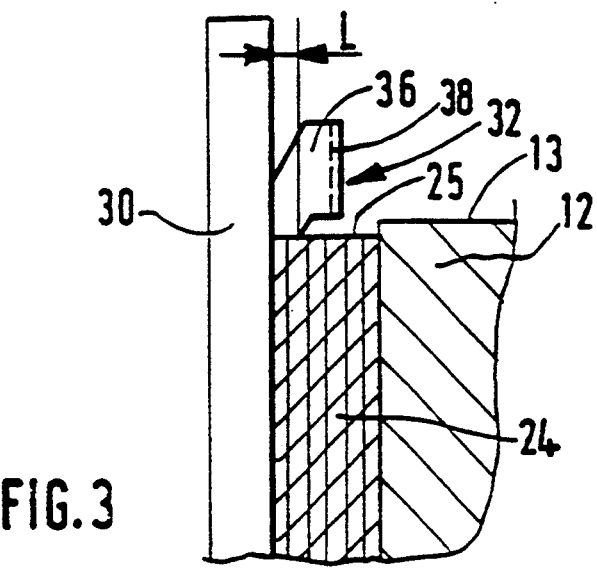
Figure 4:
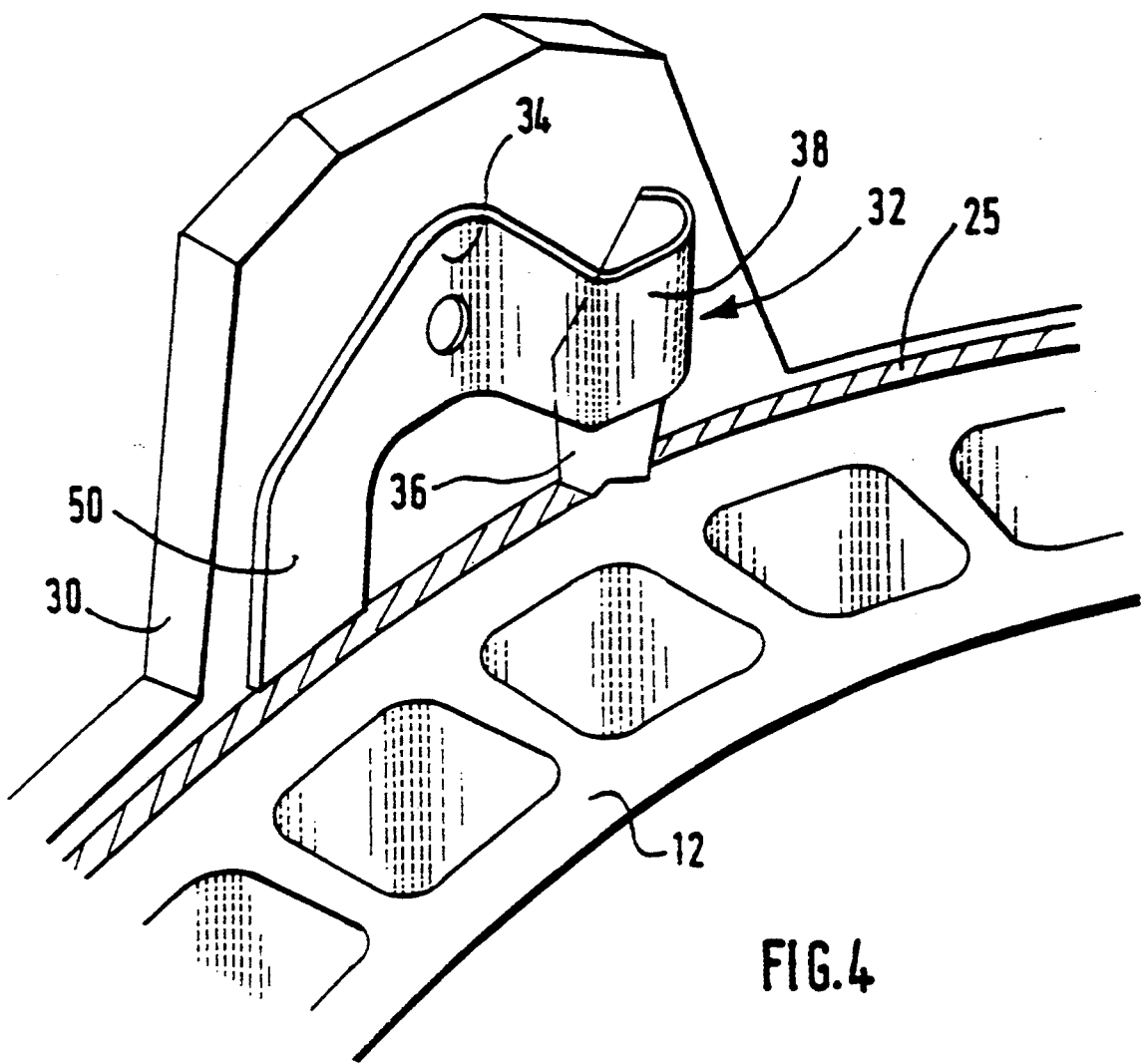
Figure 5:
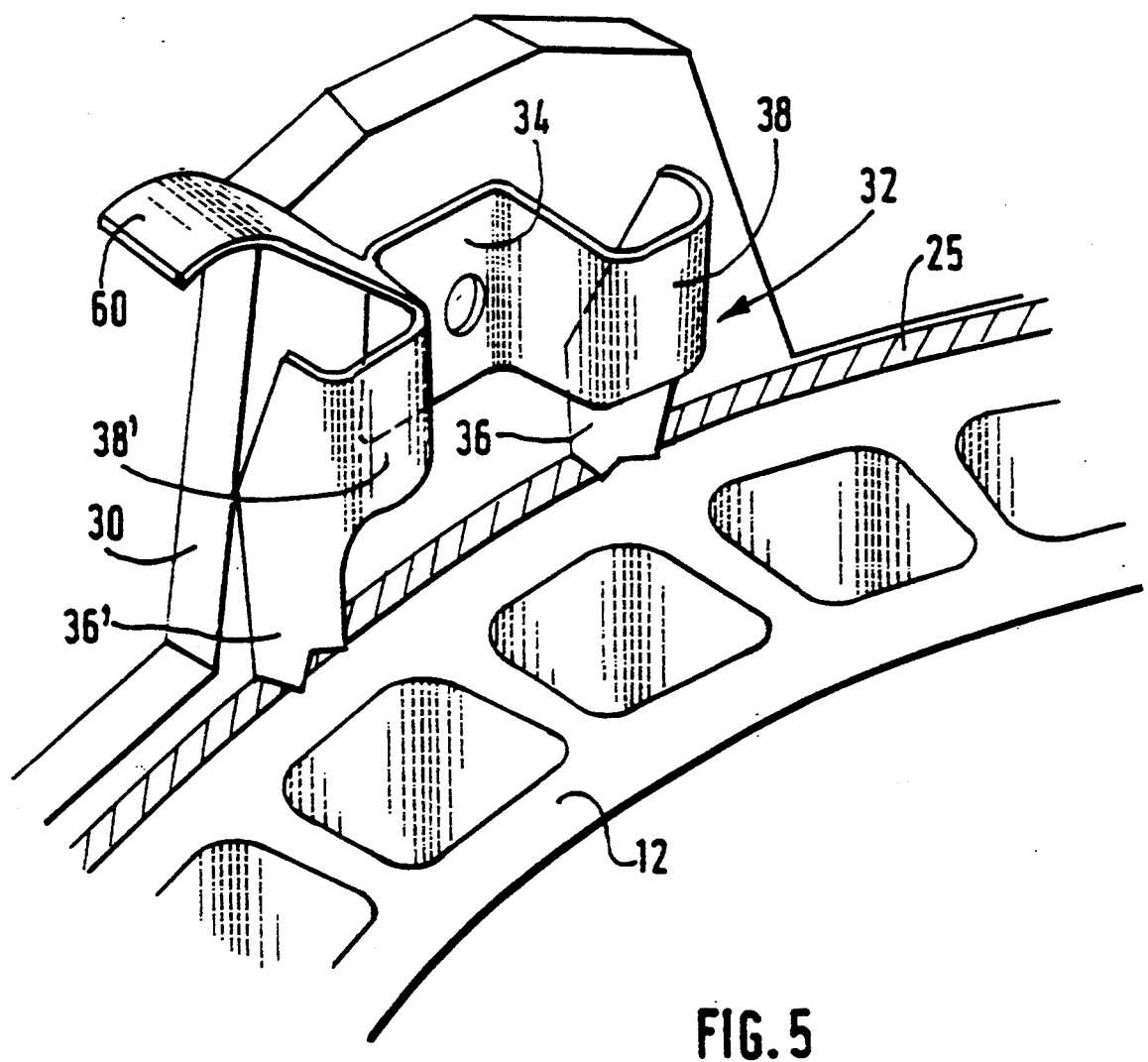

The invention will now be described by way of example with reference to the accompanying drawings in which:

FIG. 1 is a sectional view of a disk-brake fitted with friction members associated with wear indicators constructed in accordance with the teachings of this invention, FIG. 2 is a perspective view of a first embodiment of a wear indicator constructed according to the invention, FIG. 3 is a magnified end view of the wear indicator of FIG. 2, FIG. 4 is a perspective view of a second embodiment of a wear indicator constructed according to the invention, FIG. 5 is a perspective view of a third embodiment of a wear indicator constructed according to the invention.

A disk-brake 10, partially shown in FIG. 1, comprises a disk or rotor 12 associated in a known manner with an axle (not shown) and rotating with the latter. The axle housing (not shown) bears a bracket member 14 on which is slideably mounted a caliper 16, the latter comprising a piston 18 slideably mounted in a bore 20 which communicates with hydraulic means for actuation (not shown). In a known manner, the actuation means are capable of sending fluid under pressure to the interior of the bore 20 so as to cause the piston 18 to slide towards the disk 12.

In order to slow down the rotation of the disk 12, two friction elements 22 and 24 are arranged facing the opposite faces of the disk 12 and are capable of engaging the latter when the piston 18 is displaced.

The friction element 22, arranged axially towards the outside, is associated with a support plate 26, itself cooperating by any appropriate means with a reaction arm 28 of the caliper 16, whereas the friction element 24, arranged axially towards the inside, is associated with a support plate 30. The support plate 30 is slideably mounted on the bracket member 14 so that it can be moved axially with respect to the latter.

According to the invention, a wear indicator 32 is associated with at least one of the support plates 30 and 26, and preferably with both support plates, so as to generate an audible signal when the friction element 24, 22 is worn and only a predetermined thickness remains. This wear indicator, shown in greater detail in FIG. 2, is formed by a spring leaf fixed by its intermediate part 34 onto the support plate 30. The fixing may be performed by any appropriate means, for example by riveting, clipping, etc. The part 34 is connected to a first end part 36 by an intermediate zone 38 forming a U-shaped spring, and causing the part 36 to bear against the support plate 30, substantially perpendicularly to the latter.

The intermediate part 34 is, on the other hand, connected to a second end part 40 so as to lock the wear indicator 32 in rotation with respect to the support plate 30. In the example shown in FIG. 2, the second part 40 is constructed in the form of a lug cooperating with an opening 42 made in the support plate 30. Thus, and owing also to the intermediate zone 38 forming a spring, the first end part 36 bears substantially perpendicularly against the upper face 25 (referring to FIG. 2) of the friction element 24, or more precisely one of the faces of the friction element 24 which does not engage the disk 12 during a braking action. Still more precisely, the first end part 36 bears against the face 25 by its edge and over a length L, as shown in FIG. 3.

Owing to the present invention, it may be seen that the first end part 36 of the wear indicator 32, being acted upon so as to bear simultaneously against the face of the support plate 30 which bears the friction element 24 and against the face 25 of that friction element 24, will be in contact with the disk 12 when only the thickness L of the friction element 24 remains on account of its wear, this thickness L being the predetermined thickness at which it is required for the emission of a warning signal to occur. During a braking action, the disk 12, in coming to rub against the part 36, will cause the latter to begin vibrating, hence to emit an audible signal amplified by the intermediate zone 38 of the indicator 32.

A major advantage of the invention resides in the fact that, if the driver of the vehicle thus equipped neglects to have the friction member replaced, the friction element 24 continuing to wear, the first end part 36 will be compelled to remain in contact with the disk 12, thus causing the emission of an audible signal even apart from the braking periods, thus further inciting the driver of the vehicle to replace the friction members.

Another major advantage of the invention resides in the fact that, as we have seen, the wear indicator is bearing against the upper face 25 of the friction element 24. A result of this is that, as soon as only the thickness L of this friction element 24 remains, the first end part 36 of the indicator 32 is compelled to cooperate with the cylindrical surface 13 forming the periphery of the disk 12.

This peripheral surface 13, even if it had been machined, is rapidly scaled with the wear and becomes relatively rough. It follows that the peripheral surface 13 induces into the part 36 of the wear indicator 32 vibrations which are much greater than if this part 36 came to rub on the braking track of the disk 12, that is to say its flat face cooperating with the friction element 24, as do the known audible wear indicators.

In parallel, as the first end part 36 of the wear indicator 32 is bearing against the support plate 30, as soon as this part 36 begins to vibrate because of the rubbing against the disk 12, it also rubs by its edge against the support plate 30, and this procures an additional audible signal source.

FIG. 4 shows a second embodiment of a wear indicator. It may be seen in this figure that the intermediate part 34 for fixing of the wear indicator 32 onto the support plate 30 and the first end part 36 for emission of the audible signal are identical to those of FIG. 2. However, the second end part for locking of the wear indicator 32 in rotation has been modified and comprises a flat catch 50 extending against the support plate and coming to bear by its edge against the friction element 24. As in the preceding embodiment, the resilience of the intermediate zone 38 ensures that the first end part 36 is bearing substantially perpendicularly both against the support plate 30 and against the friction element 24 over the predetermined length L.

FIG. 5 shows a third embodiment of a wear indicator. It may be seen in this figure that the intermediate part 34 for fixing of the wear indicator 32 onto the support plate 30 and the first end part 36 for emission of the audible signal are identical to those of FIG. 2. However, the second end part for locking of the wear indicator 32 in rotation has been modified and is constructed in a manner identical to that of the first end part 36, symmetrically with respect to the intermediate fixing part 34. Thus, the second end part 36' itself also bears substantially perpendicularly against the face of the support plate 30 which bears the friction element 24 and against the upper face 25 (referring to FIG. 5) of the friction element 24, by its edge and over the same length L. The second end part 36' therefore serves simultaneously for locking of the wear indicator in rotation and for the emission of the audible signal.

It will therefore be clearly understood that, according to the embodiment of FIG. 5, when only the thickness L of the friction element 24 remains on account of its wear, the disk 12 will come into contact with the end parts 36 and 36' and will cause them to begin vibrating simultaneously, with the consequent emission of two audible signals amplified by the intermediate zones 38 and 38'.

These zones 38 and 38' as well as the end parts 36 and 36' may be determined so that the audible signals emitted have the same frequency or different frequencies.

An additional advantage of the invention is that, owing to its arrangement, the wear indicator may be associated with the spring habitually used in order to hold the friction member in place.

This is what is shown in FIG. 5 where it may be seen that the intermediate part 34 is also connected to a third end part 60, forming a friction member retaining spring and coming to bear, when the friction member is in place in the disk-brake 10 of FIG. 1, under the arch of the caliper 16, so as continuously to act upon the friction member in a preferred direction, for example towards the axis of the disk 12. Of course, this third end part 60 may be formed on the wear indicators shown in FIGS. 2, 3 and 4.

What is claimed is:

1. A friction member comprising a support plate and a friction element arranged on one side of the support plate, the friction element adapted to engage one face of a rotating member, and at least one wear indicator associated with the support plate so as to generate an audible signal when the friction element has, on account of wear, a predetermined thickness, the wear indicator formed by a spring comprising an intermediate part fixing the wear indicator to the support plate on a side of the plate which bears the friction element, a first end part for emission of the audible signal and a second end part locking nonrotatably the wear indicator with respect to the support plate, the first end part extending, by distances greater than the thickness of the first end part, in a plane substantially perpendicular to a plane of the support plate and to a plane of one face of the friction element which does not come to engage the rotating member during braking and bearing simultaneously against a face of the support plate which bears the friction element and against the one face of the friction element which does not come to engage the rotating member during braking, the first end part bearing against the one face over a length of the first part corresponding to the predetermined thickness, the rotating member comprising a disc, and the wear indicator cooperating with a cylindrical surface forming the axial periphery of the disk in order to generate the audible signal.

2. The friction member according to claim 1, wherein the second end part locking nonrotatably the wear indicator with respect to the support plate is a lug cooperating with an opening in the support plate.

3. The friction member according to claim 1, wherein the second end part locking nonrotatably the wear indicator with respect to the support plate comprises a flat catch extending against the support plate and bearing ay an edge against the friction element.

4. The friction member according to claim 1, wherein the second end part locking nonrotatably the wear indicator with respect to the support plate is identical to the first end part, and both end parts symmetrical with respect to the intermediate part.

5. The friction member according to claim 1, wherein the wear indicator comprises a third end part forming a friction member retaining spring.

* * * * *